United States Patent [19]

Monterosso et al.

[11] Patent Number: 4,872,007
[45] Date of Patent: Oct. 3, 1989

[54] TRANSDUCER FOR MEASURING PRESSURE IN GAS-FILLED CABLES

[75] Inventors: Gianpaolo Monterosso, Milan; Riccardo Marazzi, Vaprio d'Adda; Mario Nicotra, Segrate; Luciano Manenti, Gussago, all of Italy

[73] Assignee: Nicotra Sistemi S.p.A., Milan, Italy

[21] Appl. No.: 120,842

[22] Filed: Nov. 16, 1987

Related U.S. Application Data

[63] Continuation-in-part of Ser. No. 70,809, Jul. 7, 1987, abandoned.

[30] Foreign Application Priority Data

Jul. 24, 1986 [IT] Italy ............................ 21246 A/86

[51] Int. Cl.[4] ............................................. G08C 19/00
[52] U.S. Cl. ........................ 340/870.01; 340/870.13; 340/870.26; 73/40.5 R; 73/49.1; 379/26; 379/39

[58] Field of Search .................. 340/870, 130, 870.01, 340/870.16, 870.26; 73/40.5 R, 40.5 A, 49.1, 756, 40; 379/26, 39, 42

[56] References Cited

U.S. PATENT DOCUMENTS

| 4,111,058 | 9/1978 | Gross ................................. 340/518 |
| 4,262,287 | 4/1981 | McLoughlin et al. .............. 340/606 |
| 4,442,716 | 4/1984 | Coe et al. ....................... 340/870.13 |
| 4,549,180 | 10/1985 | Masuda .......................... 340/870.04 |
| 4,704,609 | 11/1987 | Rittenberry et al. .......... 340/870.10 |

Primary Examiner—Donald J. Yusko
Assistant Examiner—Tyrone Queen
Attorney, Agent, or Firm—Wenderoth, Lind & Ponack

[57] ABSTRACT

A pressure transducer includes a multiplexer unit for the selection of pressure sensors by decoding a sensor address, thereby permitting a single power supply, a single counter and a single clock generator to be used, in order to enable and transmit the measurements of a plurality of pressure sensors connected to a plurality of gas-filled cables.

8 Claims, 4 Drawing Sheets

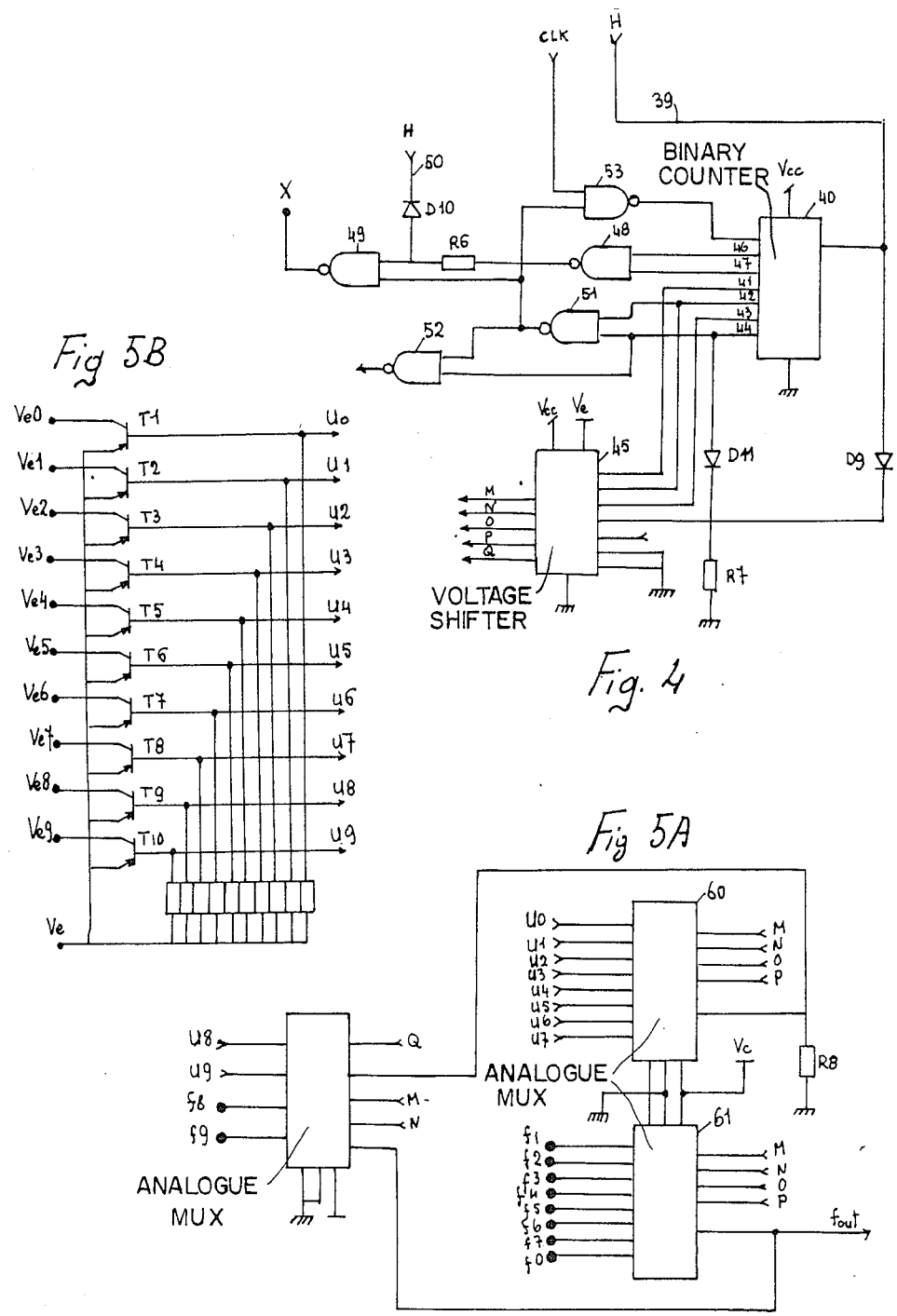

TRANSDUCER FOR MEASURING PRESSURE IN GAS-FILLED CABLES

CROSS-REFERENCES TO RELATED APPLICATIONS

This application is a continuation-in-part of our prior application Ser. No. 070,809 filed on July 7, 1987, now abandoned.

BACKGROUND OF THE INVENTION

1. Field of the invention

This invention generally relates to devices for measuring the pressure within gas-filled cables, especially cables used for data transmission and more particularly a multiple sensor pressure transducer capable of measuring the pressure level in a plurality of adjacent gas-filled cables.

2. DESCRIPTION OF THE PRIOR ART

The cable pressurizing technique is already known and is in widespread use by telephonic Companies and consists of admitting compressed and dehydrated air within the telephonic cables. This technique has the purpose of maintaining a high insulation resistance along the copper conductors, by preventing the outer moisture from entering the cable. Further, the pneumatic phenomena correlated to and resulting from possible air leakage from the cable are used to prevent the moisture from entering the cable, which is often due to the greater outer pressure, and to locate the place of these leakages.

The advantages resulting from the use of this technique are numberless, of which some are already known and some are to be discovered or demonstrated. The equipment and the devices used to attain the above objectives are evolving and improving making the application of these methods more and more attractive both from the standpoint of the technical performances and from the standpoint of the costs.

The improvement in performance is obtained by the use of the electronic techniques integrated by an effective system architecture and by a center software devised for taking the maximal advantage from the measurements and the surveys made by the equipment or devices installed in the field.

The optimization and the reduction of costs, especially of the labour for installing these systems, are important factors for a quick and effective diffusion thereof.

For measuring the pressure within gas-filled cables, pressure transducers are normally used which convert pressure to a measurable electric signal.

At present, the use of electronic pressure transducers is known which make use of a pair of wires belonging to the same gas-filled cable, the pressure of which is to be measured for transmitting to a remote location a signal having a frequency proportional to the pressure measured by the transducer.

Such transducer uses as basic components a sensor and a timer.

Such systems use a plurality of pressure transducers arranged along the gas-filled cable, in predetermined measuring locations. Each pressure transducer is provided with one own timer allowing the signal transmission for a limited time and in a predetermined time sequence so as to permit the pressure transducers to transmit one at a time their signals according to this sequence. Of course, these signals are supplied to a center unit which is capable of indicating for each of the received electric signals the associated pressure transducer in the same order as they are received and is adapted to supply simultaneously through the transmission line all the pressure transducers.

SUMMARY OF THE INVENTION

The present invention aims at providing a pressure transducer capable of controlling a plurality of sensors and therefore of providing an important cost reduction of each pressure measurement, of offering a substantial reduction of the installation costs and of reducing the operating costs in carrying out the pressure measurements in the desired locations along the gas-filled cable.

More particularly, the sensor pressure transducer according to the present invention is characterized in that it comprises:

a plurality of pressure sensors, a multiplexer unit for enabling and selecting the sensors corresponding to a coded addresses applied to an appropriate input thereof, a clock generator, a counting and timing circuit for forming the address to be delivered to the multiplexer unit, a power supply for delivering the operating voltage to the above mentioned components, and a line for delivering and returning the signal supplied by the sensors, said signal having a frequency which is proportional to the pressure.

With this system a single pair of wires can be used for transmitting measurements obtained in different pressure detecting location of other gas-filled cables laid down in the neighbourhood so that there will no longer be the necessity of having transducers in the same number as the gas-filled cables and timers in the same number as the transducers, thereby providing important savings both as to the component costs and as to the operation thereof.

BRIEF DESCRIPTION OF THE DRAWINGS

FIG. 4 shows the circuit diagram of the timing and selecting circuit and the enabling circuit of the multiplexer unit;

FIGS. 5A and 5B show the circuit diagram of the multiplexer unit;

DESCRIPTION OF THE PREFERRED EMBODIMENT

Figure 1:
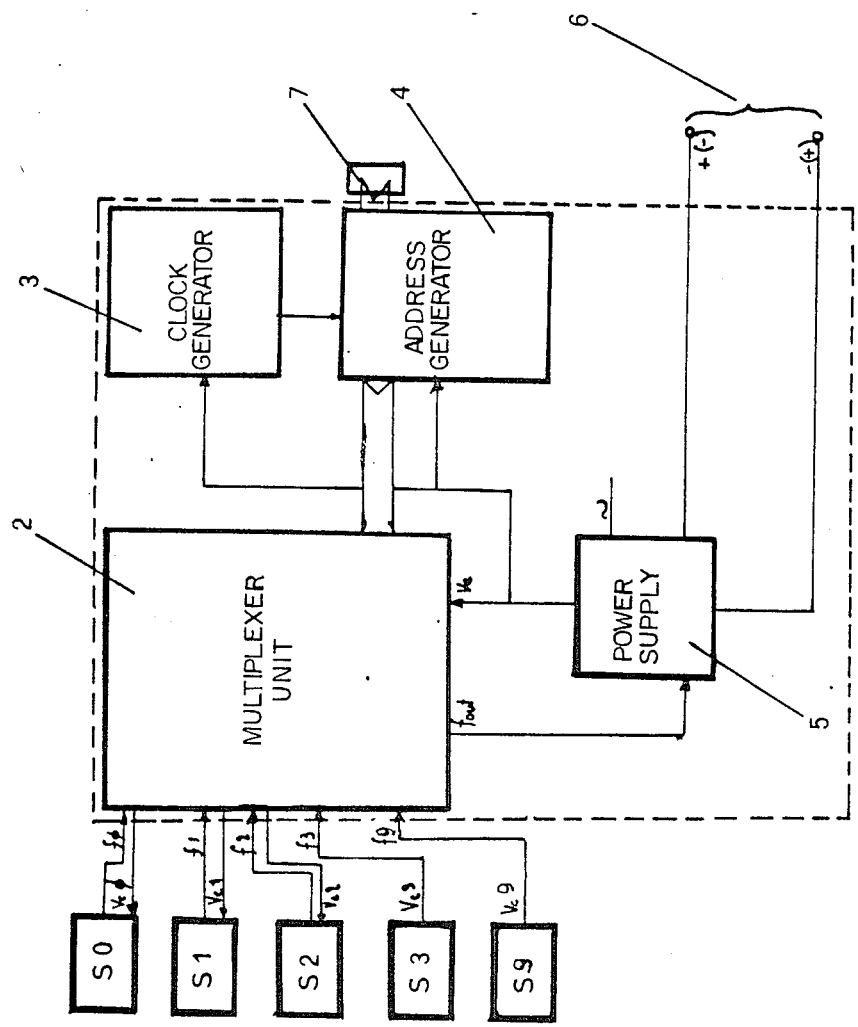
FIG. 1 is a block diagram of a multiple pressure transducer in accordance with the present invention.

Referring now to FIG. 1, the transducer comprises a plurality of sensors S0,S1,S2,S3 . . . S9 connected to a multiplexer unit 2 which is energized by a stabilized power supply 5, a clock generator 3 and an address generator 4. The address generator 4 is connected to the multiplexer unit 2 and to a device 7 for programming the address code by the operator or installer.

SENSORS

The sensor is designed so as to generate at its output a signal of a frequency which is proportional to the pressure in accordance with a well know technique, as for example:

the integrated circuit of NATIONAL SEMICONDUCTOR LM 555 and its equivalents applied as voltage-to-frequency converter (VCO) which permits the conversion of the voltage to a frequency;

the VCO circuit disclosed in "Application Note 81" AN81-3 issued in June 1973 described in "LINEAR APPLICATION HANDBOOK" of the National Semiconductor.

The voltage-to-frequency converter circuit provides as an output a frequency signal which is proportional to the voltage applied to its input.

Should a suitable resistor change its resistance, a voltage change thereacross will occur.

This voltage, when applied to the VCO circuit, allows a signal to be measured, and changes the frequency which is proportional to the electric resistance.

The piezoresistive and extensometric pressure sensors used today in commerce have the characteristic of changing their resistive value in a manner proportional to a force applied and therefore to the pressure applied on their surface.

CLOCK GENERATOR 3

Figure 2:
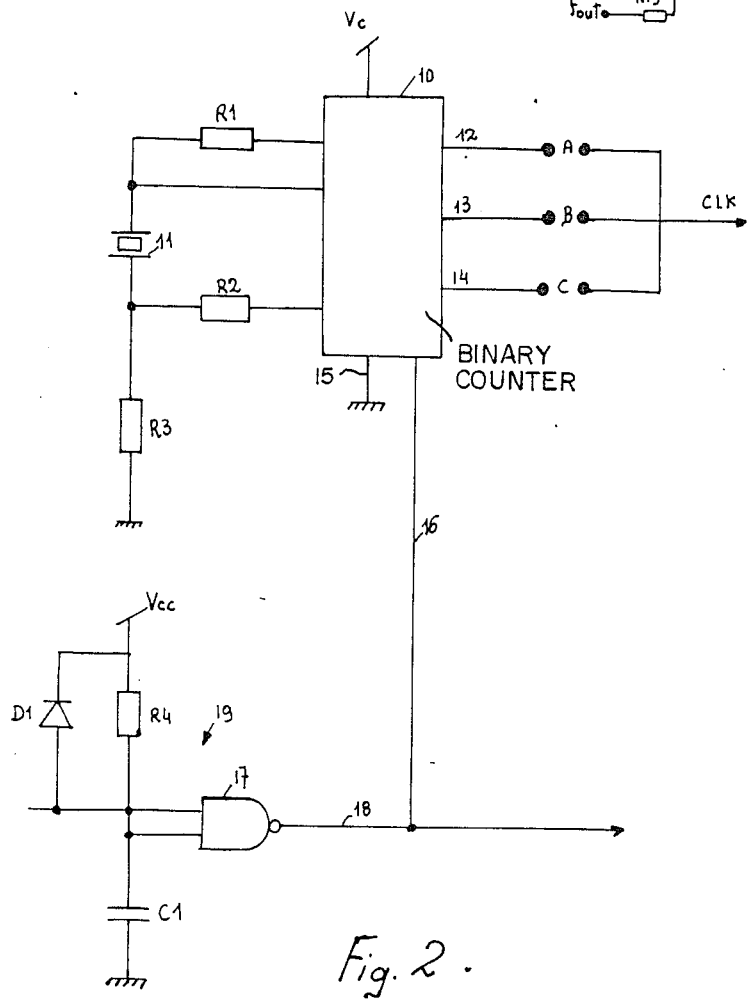
FIG. 2 shows the circuit diagram of the clock generator.

As can be seen in FIG. 2, the clock generator 3 comprises a binary counter 10 and a quarz 11 having an oscillation frequency of 32768 Hz, which is connected to the binary counter 10 through a set of two parallel connected resistors R1,R2, and one series connected resistor R3 which are intended to keep unchanged the characteristics of the oscillator 11 with respect to the time and the temperature. The binary counter 10 has three outputs 12,13,14 each emitting a square wave of different frequency, for example 3 $2768/2Hz^7$, 3 $2768/2Hz^8$ and 3 $2768/2Hz^9$. By bridging terminals A,B,C of the binary counter outputs the desired clock frequency of the system can be selected as output CLK.

The binary counter is supplied by a voltage Vc and is grounded at 15. Also connected to the binary counter 10 through the lead 16 is a reset circuit 19 comprising a NAND gate 17 the two inputs of which are connected to each other through a resistor R4 and a diode D1 parallel connected to each other and a capacitor C1 connected to ground. The output 18 of the NAND gate 17 is connected to the address generator 4.

ADDRESS GENERATOR 4 AND PROGRAMMING DEVICE 7

Figure 3:
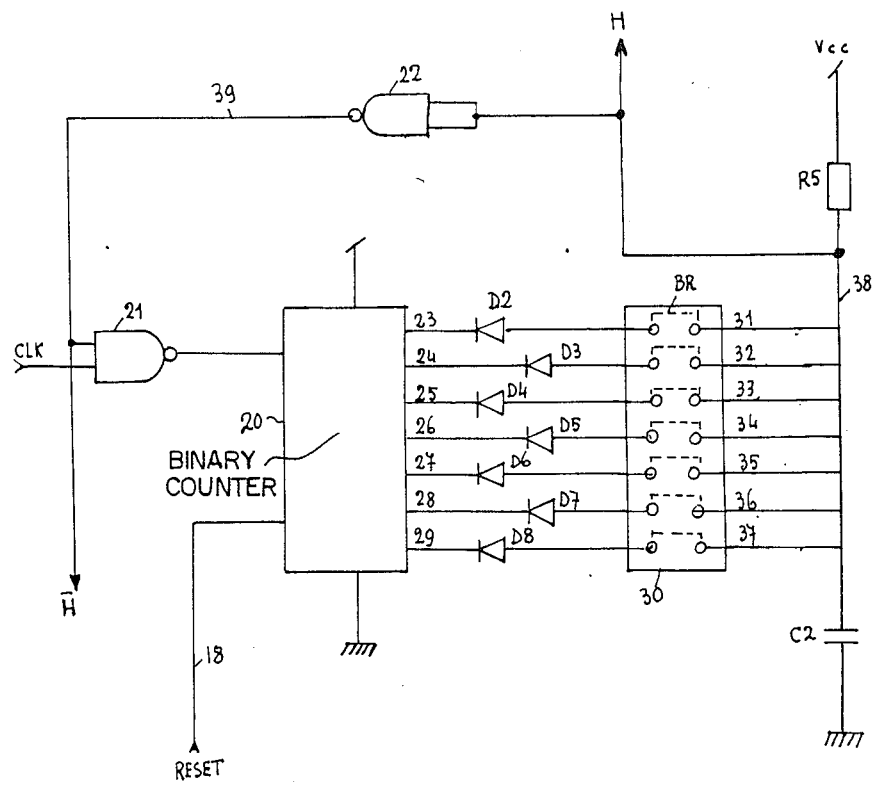
FIG. 3 shows the circuit diagram of the address generator and the programming device.

As can be seen in FIG. 3, the address generator 4 comprises a binary counter 20 having seven outputs 23 to 29. The outputs 23 to 29 of the binary counter 20 are connected through diodes D2 to D8 to the programming device 7.

The programming device 7 is formed by an interface 30 comprising seven bridges BR which connect the outputs 23 to 29 to the wires 31 to 37 which are connected to the output line 38 in order to provide in a binary code the device address. In effect, the wires 31 to 37 supply bits of weight 1 to 6. Line 38 is connected at one end to a capacitor C2 connected to ground. Lead 38 supplies the address signal H to the multiplexer unit and to the two inputs of a NAND gate 22, the output of which supplies the inverted address signal $\overline{H}$, on the lead 39, also to the multiplexer unit 2 and to one input of a NAND gate 21, to the other input of which the signal CLK is applied and the output of which is connected as input to the binary counter 20.

MULTIPLEXER UNIT 2

The multiplexer unit 2 is comprised of four blocks, namely:
(1) Timing and selecting circuit
(2) Voltage level shifter
(3) Power supply enabling circuit
(4) Multiplexer.

As can be seen in FIG. 4, the timing and selecting circuit comprises a binary counter 40 supplied by the voltage Vcc and having as an input the inverted signal $\overline{H}$ coming from the programming device 30 through lead 39. The outputs 41 to 44 of the binary counter 40 supply signals of binary count as inputs to a voltage shifter 45 which gives on its outputs the binary coded signals M,N,O,P,Q adapted for the multiplexer unit. Lead 39 of the inverted address signals $\overline{H}$ is also applied, through a diode D9, to an input of the voltage shifter 45. Output 44 is also connected to ground through a diode D11 and a resistor R7. From the binary counter 40 two outputs 46,47 are connected to the two inputs of a NAND gate 48 the output of which is connected, through a resistor R5, to one input of NAND gate 49, the output of which supplies a signal X to the power supply circuit. Intermediate the resistor R6 and the NAND gate 49 a diode D10 is connected through a lead 50 which supplies the address signal H. The outputs 42,44 of the binary counter 40 are also applied to the two inputs of a NAND gate 51 the output of which is connected to one input of another NAND gate 52, the other input of which is connected to the output 44 of the binary counter 40. The output of the NAND gate 52 supplies a signal which is applied as one input to the voltage shifter 45. The output of the NAND gate 51 is also connected to one input of the NAND gate 49 and to one input of a further NAND gate 53 to the other input of which the clock signal CLK is applied and the output of which is connected to the binary counter 40.

The multiplexer unit 2 is illustrated in FIGS. 5A and 5B and comprises the analogue multiplexers 60,61,62. The multiplexers 60,62 receive as inputs the signals U0 to U9 which control the bases of transistors T1 to T10 of the power supply enabling circuit. These multiplexers receive also as inputs the coded signals M,N,O,P,Q coming from the voltage shifter 45. The multiplexer 61 supplies the signals f0 to f9 and is set to receive the frequency signal $f_{out}$ coming from the sensor selected by the multiplexer unit by means of the coded signals M,N,O,P, from the voltage shifter.

POWER SUPPLY CIRCUIT 5

Figure 6:
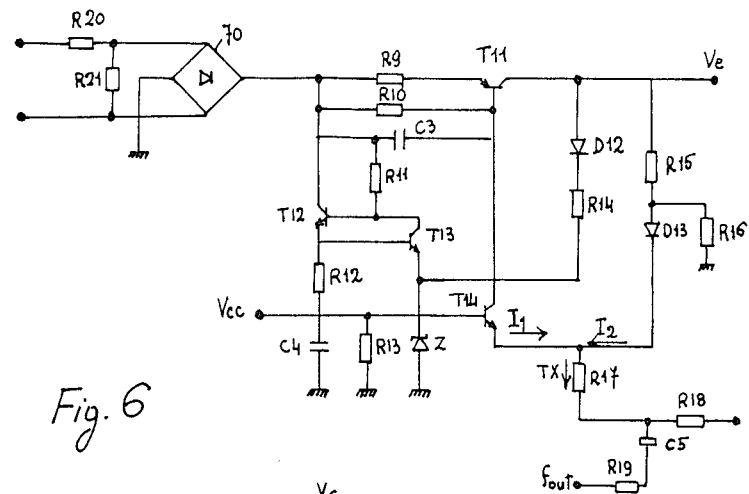
FIG. 6 shows the stabilized power supply circuit.

The power supply circuit 5 supplies the voltage Vcc (+5V) and Ve (+12V) to the system, these voltages are obtained from the line voltage. As can be seen in FIG. 6, this circuit comprises two input lines provided with parallel connected resistor R20,R21 and connected to a diode bridge 70 series connected through a resistor R9 to the emitter of a transistor T11, the collector of which gives as output the voltage Ve. Upstream the resistor R9 the collector of a transistor T12 is connected, the emitter of which is connected to ground, through a resistor R12 and a capacitor C4, while the base of this transistor is connected to the collector of a transistor T13, the base of which is connected intermediate the emitter of transistor T12 and the resistor R12 and the emitter of which is connected to a diode Zener Z which is connected to ground and, through a resistor R14 and a diode D12, to the output carrying the voltage Ve. The base of transistor T12 is connected through a resistor R11 to c capacitor C3 parallel connected intermediate the base of transistor T11 and the collector of transistor T12, between which also a resistor R10 is parallel connected. The base of transistor T11 is connected to the collector of a transistor T14, the emitter of which is connected to the output Ve through a diode D13 and a resistor R15. Intermediate the diode D13 and the resistor R15 a resistor R16 is connected to ground. The emitter of transistor T14 is also connected through a resistor R17 and a resistor R18 to the terminal of signal X. Upstream the resistor R18 a capacitor C5 is connected which, through a resistor R19, is connected to the frequency terminal $f_{out}$. The base of transistor T14 supplies the voltage Vcc.

The voltage Vcc obtained through the diode Zener Z is suitably filtered by the capacitor C4. The limitation of current of the voltage Vcc is given by the current generator formed of the transistors T12,T13 and the resistor R12. This resistor is provided for deciding the current of the generator. The resistor R13 is provided for discharging the capacitor C4 when there is a lack of line voltage.

The voltage Ve is generated only when the system requires it, namely when the signal X is at 0 volt. With the signal X is at 0 Volt the transistor T14 becomes conducting, thereby biasing the base of transistor T11. The current Ix flowing in the branch R17-R18 is constant since the voltage drop across the resistors R17,R18 is constant. This voltage is given by the following relation:

$$V_z^2 - V_{be}\ (T14)\ I_x = I_1 + I_2.$$

The voltage Ve is stabilized by the balance formed between the currents $I_1$ and $I_2$ since if a decrease of Ve would occurs, there will be a resulting decrease of the current flowing in the branch R15-D13 and, since Ix is constant, this would cause a current increase at T14. This current increase should bias the transistor T11 more strongly with a resulting increase of the Ve value. In the presence of the voltage Ve, a portion of the current necessary for the diode Zener Z is picked up by the base of transistor T14. The current lacking to the diode Zener Z is provided by the branch D12-R14. A second function of this power supply circuit is to transform the frequency signal supplied by the terminal $f_{out}$ in a current modulation. This transformation is always based upon the current picked up by the branch R17,R18. The capacitor C5 acts as a high pass filter.

OPERATION

The operation of the multiple pressure transducer according to this invention is as follows.

When to the power supply circuit 5 is supplied with a the a.c. voltage, the power supply 5 provides the necessary operating d.c. voltages Ve, Vc and Vcc to the clock generator 3, the address generator 4 and the multiplexer unit 2, respectively.

Then the clock generator 3 starts to deliver to address generator 4 a chain of clock pulses CLK having a stable and precise frequency. By employing this frequency the address generator 4 makes a count which generates a different bit code for each pulse. The reset circuit 19 supplies a RESET signal to the binary counter 10, for its initialization through lead 16, i.e. to bring to a low logic level "0" the outputs 23 to 29 and to initialize the address generator 4. The RESET signal remains at the high logic level "1" until the voltage on the capacitor C1 overcomes the treshold level of the NAND gate 17. Diode D1 is provided for quickly discharging the capacitor C1 at the time where there would be a lack of voltage Vcc supplying the reset circuit, thereby permitting a new initialization of the binary counter 10.

When the generated code is the same as the code programmed by the operator or installer through the programming device 7 (obtained by connecting one or more of the bridges BR in this device), the address generator 4 generates on the output 38 the address signal H corresponding to the first pressure sensor SO. This address signal H is supplied to the timing and selecting circuit. The signal $\overline{H}$ suitably inverted through the NAND gate 22 is supplied to the multiplexer unit 2 in order to keep it to zero as long as all the outputs 23 to 29 connected to the capacitor C2 through the programming device 30 are in the logic state "1". Only with this precise configuration the capacitor C2 is kept charged (logic level "1") thereby bringing the signal $\overline{H}$ to a high level. The signal $\overline{H}$, suitably inverted by the NAND gate 22 starts the binary counter 40, the outputs 41 to 44 of which are applied to the voltage shifter 45 which gives as output the coded signals M,N,O,P,Q for the multiplexers 61,62. (An example of the voltage shifter is the MC14504B level shifter sold by Motorola, the purpose of which is to bring the voltage Vcc to the level of the voltage Vc necessary for enabling the multiplexer unit). The signal $\overline{H}$ at the same time disables the address generator 4 by locking the clock signal CLK to the binary counter 20 by means of the NAND gate 21.

This address is decoded by the multiplexer unit 2 which diverts to the selected one of the sensors SO to S9 the operating voltage Ve from the power supply 5 and also diverts the frequency signal $f_{out}$ generated by the sensor through the power supply 5 and to the signal output line 6.

The start of the measurings is provided by the inverted address signal $\overline{H}$ coming from the address generator 4 through wire 39. The binary counter 40 remains with all the outputs 41-46 low as long as the inverted address signal $\overline{H}$ is high, thereby desabling all the cascade connected blocks. By bringing the H signal to the logic level 0 the binary counter 40 starts to count thereby giving again on its outputs 41 to 44 a binary count which through the voltage shifter circuit 45 form the "words" M,N,O,P,Q necessary for the multiplexer unit to select the sensors S0 to S9. The supplied voltage Ve is generated exclusively when the signal X coming from the output of the NAND gate 49 is at a low lever "0". The signal X is applied to the power supply circuit 5 for controlling it. This enabling circuit is therefore intended to establish when the signal X is to be brought to 0 through the NAND gates 48,51 and 49.

During the selection, the logic levels of these NAND gates bring the signal X to a low logic level for 3/4 of the selection time of the sensor. The high logic level of signal X is permitted, before the selection, by the address signal H entering through wire 50 and, after the selection, by the signal coming from the output of the NAND gate 51. Another function of this enabling circuit is to distribute the supply voltages Ve0 to Ve9 to the various sensors. This function is carried out by a set of transistors T1 to T10 (FIG. 5B) controlled through their bases by the multiplexers 60,62. The bases of these transistors supply to the multiplexers 60,62 the signals U0 to U9. By connecting the base of the pre-selected transistor to the resistor R8 the voltage Ve is present on the collector of the same transistor.

After a short predetermined time is elapsed, the address generator 4 interrupts the signal output and then the address generator 4 generates the coded address corresponding to the following sensor.

This procedure will be repeated as many times as the sensors connected to the multiplexer unit 2 are.

As can be seen, the pressure transducer comprises:

a multiplexer unit which enables and selects the sensor corresponding to the coded address presented at a suitable input thereof;

a clock generator for the counting chain;

a counting and timing circuit which generates the address to be supplied to the multiplexer unit for selecting one of the externally connected sensors;

a power supply for delivering the supply voltage to the remaining components of the circuit; and the line on which the power is supplied and the signal proportional to the pressure is generated by the sensors.

By arranging a transducer according to the invention in each of the chambers or pits intended to receive it, the pressures of the other adjacent gas-filled cables can be measured so that in a single measuring location, a single transducer can measure the pressure of more than one gas-filled cables which run through the same location and these pressure values can be supplied to the control station in sequence by means of the multiplexer unit. The advantages provided by the multiple pressure transducer according to this invention with respect to the single pressure transducers now available in commerce are the following:

(1) Cost reductions for each measurement because the costs of the common components are divided by the number of used measurement locations.

(2) Substantial cost savings in the multiple pressure transducer installation because it is sufficient to make a single electric connection to the location in which it is desired to detect the pressure.

(3) Operating cost reduction of the pressure transducers because a single loop is used.

What is claimed is:

1. A pressure transducer for measuring the pressure within a plurality of gas-filled telephonic cables comprising:

a plurality of pressure sensors, each detecting said pressure within said plurality of gas-filled telephonic cables, and each outputting a frequency signal having a frequency which is proportional to a level of said detected pressure;

a multiplexer unit for selecting and enabling said plurality of pressure sensors according to a coded address assigned to each of said plurality of pressure sensors, and for transmitting each frequency signal received from each of said plurality of pressure sensors;

an address generator for forming and delivering to said multiplexer unit each coded address assigned to each of said plurality of pressure sensors;

a clock generator connected to said multiplexer unit through said address generator, for controlling a rate of operation of said multiplexer unit and said address generator;

a power supply unit for delivering an operating voltage to said multiplexer unit, said clock generator, and said address generator; and, a single loop for supplying electric power to said power supply unit and for outputting each frequency signal transmitted from said multiplexer unit.

2. A transducer as claimed in claim 1, wherein said address generator comprises a programming device for generating each of said coded addresses.

3. A transducer as claimed in claim 1, wherein said multiplexer unit includes a voltage level shifter for enabling said multiplexer unit and a power supply enabling circuit for enabling said power supply unit when measuring said pressure.

4. A transducer as claimed in claim 1, wherein said address generator comprises a binary counter.

5. A transducer as claimed in claim 1, wherein each of said plurality of pressure sensors comprises a voltage-to-frequency circuit for outputting a frequency signal which is proportional to a voltage applied to an input of said voltage-to-frequency circuit.

6. A transducer as claimed in claim 2, wherein said address generator comprises a binary counter and wherein said programming device comprises bridges connecting outputs of said binary counter to said multiplexer unit.

7. A transducer as claimed in claim 1, wherein said power supply unit is a stabilized power supply.

8. A transducer as claimed in claim 1, wherein said multiplexer unit comprises a plurality of analog multiplexers.

* * * * *